Patented July 26, 1949

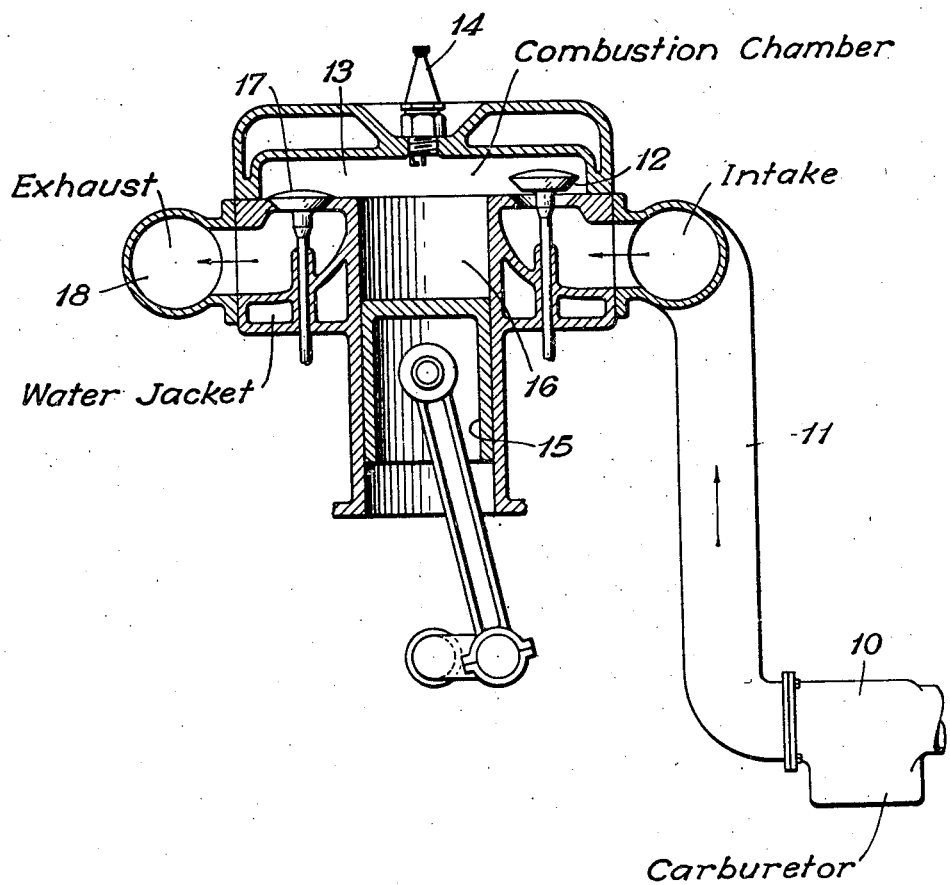

2,477,098

UNITED STATES PATENT OFFICE 2,477,098

INTERNAL-COMBUSTION ENGINE
OPERATION

Harry N. Taylor, Chicago, Ill., and Edwin A.
Droegemueller, West Hartford, Conn., assignors
to Standard Oil Company, Chicago, Ill., a corporation of Indiana Application May 24, 1943, Serial No. 488,240

3 Claims. (Cl. 44—68)

The present invention relates to improvements in operating spark-ignition internal combustion engines employing metallic antiknock agents and more particularly to means for maintaining the combustion chambers of such engines substantially free of deposits. The invention also relates to a method of preventing and/or removing deposits in the cylinders of internal combustion engines using fuels containing metallic organic antiknock compounds.

It is well known that the knocking in certain types of spark-ignition internal combustion engines can be eliminated by the use of various metallic organic antiknock compounds, such as certain metallic alkyl, particularly lead alkyl compounds such as, for example, tetraethyl lead and the like. While such organic compounds are very effective for their intended purpose, they are in certain aspects objectionable because they result in the formation of deleterious deposits in the combustion chambers of the internal combustion engines. These deposits are composed primarily of the product or products of chemical reaction between the metallic constituent of the alkyl compound and oxygen. Such deposits may also be formed by reaction between the metallic constituent of the alkyl compound and the non-metallic compounds such as phosphorus, sulfur, bromides, chlorides, etc. which may be contained in the fuel, or its additives. These deposits, which are generally extremely stable and relatively non-volatile, are deleterious in that they not only reduce the heat transfer of the combustion chamber walls with resultant overheating of the incoming charge, but they also cause a material loss in the horsepower output of the engine. Tests have demonstrated that losses of greater than 15% of the horsepower output are obtained in engines operating on fuels containing such metallic organic additives.

It is an object of the present invention to provide a method of maintaining the combustion chambers of spark-ignition engines, using a fuel containing a metallic organic antiknock agent, substantially free of deposits. Another object of the invention is to provide a means of removing from the combustion chambers of spark-ignition engines, deposits formed by metallic organic antiknock agents. Another object of the present invention is to provide a method of preventing deposits in the combustion chambers of internal combustion engines employing fuels containing metallic organic antiknock additives. Other advantages and objects of the invention will become apparent from the following description thereof read in conjunction with the accompanying drawing which forms a part of this specification, and which shows a portion of an automotive fuel system and a vertical sectional elevation of a cylinder head assembly of a section of a 4-cycle spark-ignition internal combustion engine, which is illustrative of an apparatus to which the herein-described invention is applicable.

We have discovered that the foregoing objects can be attained by adding to motor fuels containing metallic organic antiknock additives, or by introducing into the combustion chambers of the engine, small amounts of certain organic copper compounds, particularly the copper soaps of carboxylic acids, oleic acid, palmitic acid, linoleic acid and the like. The quantity of such organic compounds employed can vary between about 0.001% and about 5% and preferably between about 0.01% and about 2% of the weight of the fuel. Experiments have demonstrated that the addition of small amounts of such copper soaps is very effective not only in preventing the formation of combustion chamber deposits but also very effective in removing deposits already formed in the combustion chamber.

The present invention is particularly adaptable to spark-ignition internal combustion engines of the type illustrated in part by the accompanying drawing. Referring to the drawing, in the operation of a spark ignition internal combustion engine, fuel from carburetor 10 is introduced via intake manifold 11 and inlet valve 12 into the combustion chamber 13 and ignited by means of spark plug 14. The gases, resulting from the combustion of the fuel, act upon the piston 15 in cylinder 16 forcing it downward. On the upward stroke of the piston 15 the outlet valve 17 is opened and the gases forced out of combustion chamber into exhaust manifold 18. In operating a spark-ignition internal combustion engine of the type described with a motor fuel containing an organic metallo anti-knock compound, particularly an organic lead compound deleterious deposits are formed in the combustion chamber 13, and around the valves 12 and 17, as well as on the underside of the cylinder head 19. When small amounts of an organic copper compound, particularly a copper soap of a fatty acid are added to the so-called "doped" fuel and the mixed fuel is introduced via the carburetor 10, intake manifold 11, and inlet valve 12 into the combustion chamber 13 wherein it is ignited these deleterious deposits are removed and/or not formed.

While we do not wish to be held thereto, it is believed that the mechanism by which this inhibition and/or removal of deposits is accomplished is by the displacement of the metal in the deposit by the copper which forms a compound of sufficiently higher volatility to be removed through the engine exhaust.

The effectiveness of small amounts of copper organic compounds, such as copper oleate, in improving the engine performance of internal combustion engines employing a motor fuel containing a metallic alkyl compound, such as tetraethyl lead as antiknock agent, is demonstrated by the following examples which are intended to be illustrative of the invention and not a limitation thereof.

Example No. 1

A 1940 Ford engine was operated for 47 hours on a standard motor fuel containing 3 cc. of tetraethyl lead per gallon of fuel and an additional 12 hours on the same fuel containing about 0.005 weight percent copper oleate. The engine operating conditions were 26.2 brake horsepower at 3000 R. P. M. The test conditions were wide open throttle at 3000 R. P. M.

|  | B. H. P. | Lb. Fuel, B. H. P./Hr. | Ft.³ Air Consumed/Hr. |
|---|---|---|---|
| (a) Clean engine | 81.0 | 0.613 | 8,620 |
| (b) After 47 hours on Fuel +3.0 cc. PbEt₄/gal | 65.2 | 0.653 | 8,060 |
| Loss | 15.8 | 0.040 | 560 |
| Percent Loss¹ | 19.5 | 6.5 | 6.5 |
| (c) After 12 hrs. on Fuel treated with 0.005% (weight) Cu oleate | 75.3 | 0.599 | 8,470 |
| Gain | 10.1 | 0.054 | 410 |
| Percent Gain² | 15.5 | 8.27 | 5.08 |

¹ Based on (a).
² Based on (b).

The above data show the improvement obtained in engine performance in operating with a leaded fuel containing copper oleate. The improvement obtained is attributable to the inhibition of deposit formation in the combustion chamber and/or the removal of the deposit from it during the initial operation period during which time the engine was operating on a fuel containing no organic copper compound such as the copper oleate.

Example No. 2

The effect of copper oleate on combustion chamber deposits is illustrated by the following data which were obtained on a 1940 Ford engine operating for 65 hours at 26.2 brake horsepower and 3000 R. P. M. The base fuel used was a premium motor fuel containing 3 cc. tetraethyl lead (T. E. L.).

|  | Control test | Addition of 0.0015% (wt.) copper oleate |
|---|---|---|
| Loss in B. H. P. at 3000 R. P. M. at W. O. T. | 11.1 | 4.8 |
| Wt. of deposit, gms. | 135.80 | 58.45 |

The above data show the marked improvement in engine efficiency, and in the amount of deposit formed in the combustion chamber when a fuel containing copper oleate in combination with tetraethyl lead is employed.

Example No. 3

The improvement in brake horsepower output, fuel consumption and octane number requirements in operating on a leaded gasoline containing sufficient copper oleate to provide .006 gram of copper per gallon of fuel are demonstrated by the following data obtained after 25 hours of operation in an engine containing heavy deposits from previous operation on a leaded fuel:

|  | Brake horsepower output of engine | Lb. Fuel consumed per B. H. P.-Hr. | Octane number req'd. for trace knock |
|---|---|---|---|
| Leaded Fuel | 56.6 | 0.609 | 72.0 |
| Leaded Fuel and Copper Oleate | 59.7 | 0.593 | 70.0 |
| Per Cent Improvement | 5.2 | 2.7 | 2.8 |

The above data indicate a substantial removal of the deposit already formed in the engine by the use of small amounts of a copper organic compound in the leaded gasoline.

In addition to the improvements contained in the foregoing examples, other improvements such as elimination of pre-ignition and subsequent improvement in smoothness under high loads at low speeds were observed.

Under certain conditions, it may be preferable to inject the copper compound dissolved in a suitable solvent directly into the combustion chamber or into the manifold instead of adding the copper organic compound to the motor fuel before it is to be used in the engine. This may be accomplished by any well known method of adding a supplementary liquid to fuel supplied to internal combustion engines, such as by the means described in U. S. 2,053,200, issued to C. F. Muller et al. September 1, 1936, U. S. 2,135,431 issued to L. B. Kimball November 1, 1938 and others. This method is particularly well suited when the fuel used is susceptible to gum formation in the presence of copper or copper compounds. Certain fuel, such as straight-run gasolines do not tend to form such gum.

The fuel containing the metallic alkyl compound and copper soap may also contain as adjuncts thereto other materials, such as small amounts of viscous mineral oils, for example a mineral lubricating oil, antioxidants which function as "gum inhibitors," metal deactivators, such as copper deactivators which inhibit the catalytic oxidizing effect of copper and the like.

It is to be understood that the invention is not to be limited by any theories advanced as to the operation of the invention, nor by the specific examples given herein for the purpose of illustration only, except in so far as the same is defined by the appended claims.

We claim:

1. A non-detonating motor fuel composition for internal combustion engines which forms substantially no deposits in the combustion chamber of the internal combustion engine consisting essentially of a gasoline motor fuel, a lead alkyl antiknock compound and from about 0.001% to about 5.0% of a copper soap of a high molecular weight fatty acid.

2. A non-detonating motor fuel composition as described in claim 1 in which the organic copper soap is copper oleate.

3. A non-detonating motor fuel composition as described in claim 1 in which the antiknock compound is lead tetraethyl.

HARRY N. TAYLOR.
EDWIN A. DROEGEMUELLER.

REFERENCES CITED

The following references are of record in the file of this patent:

UNITED STATES PATENTS

| Number | Name | Date |
|---|---|---|
| 1,299,805 | Stekelberg | Apr. 8, 1919 |
| 1,669,181 | Walter | May 8, 1928 |
| 1,692,784 | Orelup et al. | Nov. 20, 1928 |
| 1,812,092 | Gravell | June 30, 1931 |
| 1,940,439 | Alleman | Dec. 19, 1933 |
| 1,974,071 | Kimball | Sept. 18, 1934 |
| 1,975,619 | Rector | Oct. 2, 1934 |
| 1,980,097 | Ruddies | Nov. 6, 1934 |
| 2,086,775 | Lyons et al. | July 13, 1937 |
| 2,230,642 | Fischer et al. | Feb. 4, 1941 |
| 2,364,921 | Shokal | Dec. 12, 1944 |
| 2,407,263 | Linch | Sept. 10, 1946 |